(12) United States Patent
Gallas et al.

(10) Patent No.: US 8,048,343 B2
(45) Date of Patent: Nov. 1, 2011

(54) LIGHT FILTERS USING YELLOW MELANIN AND MELANIN-LIKE OLIGOMERS AND PHOTOCHROMIC DYES

(75) Inventors: James M. Gallas, San Antonio, TX (US); Ira Hessel, San Antonio, TX (US)

(73) Assignee: Photoprotective Technologies, San Antonio, TX (US)

( * ) Notice: Subject to any disclaimer, the term of this patent is extended or adjusted under 35 U.S.C. 154(b) by 371 days.

(21) Appl. No.: 11/417,419

(22) Filed: May 4, 2006

(65) Prior Publication Data

US 2006/0282066 A1 Dec. 14, 2006

Related U.S. Application Data

(60) Provisional application No. 60/678,081, filed on May 5, 2005.

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)
*G02B 5/23* (2006.01)

(52) U.S. Cl. ........ 252/582; 351/159; 359/350; 359/355; 359/356; 359/361; 359/642; 428/412; 428/441; 523/106; 524/110; 210/656

(58) Field of Classification Search ...... 606/9; 351/159; 428/1.1, 1.3, 412, 441; 359/642, 350, 355, 359/356, 361; 524/110; 252/582, 587, 588; 523/106

See application file for complete search history.

(56) References Cited

U.S. PATENT DOCUMENTS

| | | | | |
|---|---|---|---|---|
| 4,843,247 A | * | 6/1989 | Yamazoe et al. | 250/573 |
| 5,378,272 A | * | 1/1995 | Romagosa et al. | 106/273.1 |
| 6,228,289 B1 | * | 5/2001 | Powers et al. | 264/1.36 |
| 2003/0184863 A1 | * | 10/2003 | Nakagoshi | 359/491 |
| 2004/0042072 A1 | * | 3/2004 | Gallas | 359/356 |
| 2004/0145701 A1 | * | 7/2004 | Miniutti et al. | 351/159 |
| 2005/0009964 A1 | * | 1/2005 | Sugimura et al. | 524/110 |
| 2005/0041299 A1 | * | 2/2005 | Gallas | 359/642 |
| 2005/0053729 A1 | * | 3/2005 | Bourdelais et al. | 428/1.1 |

OTHER PUBLICATIONS

Gallas, J. M. Melanin-based photoprotective products in plastics Melanin; Its Role in Human Photoprotection, A Melanin Symposium, Washington, D C., Mar. 11-12, 1994 (1995), Meeting Date 1994, 277-284. Editor(s): Zeise, Lisa; Chedekel, Mlles R.; Fitzpatrick, Thomas B. Publisher: Valdenmar Publishing, Overland Park, Kans.*

* cited by examiner

*Primary Examiner* — Ling Choi
*Assistant Examiner* — Bijan Ahvazi

(57) ABSTRACT

Light filters that use yellow melanin or melanin like materials prepared to have a yellow color and a melanin transmission spectrum in combination with a photochromic dye are disclosed. The yellow form of melanin has minimal impact on the perception of light intensity with transmission values greater than 80%. The combination allows for a single light filter suitable for both night driving and sunglass applications and which also preserve color perception.

12 Claims, 5 Drawing Sheets

LIGHT FILTERS USING YELLOW MELANIN AND MELANIN-LIKE OLIGOMERS AND PHOTOCHROMIC DYES

RELATED PRIORITY DATE APPLICATION

This application claims the benefit under 35 U.S.C. 119(e) of the U.S. provisional application No. 60/678,081 filed on May 5, 2005.

FIELD OF THE INVENTION

This invention relates to the field of melanins and, more particularly, to the preparation and use of yellow melanin as a pigment to provide ultra-violet, visible and near infrared absorption. Still more particularly, the invention relates to the use of yellow melanin in combination with photochromic dyes as a radiation absorbing pigment in opthaimic devices, protective eye wear and other similar media suitable for providing protection from radiation.

BACKGROUND OF INVENTION

The reduction of high energy visible (HEV) light is useful in light filters because this reduction leads to reduced glare and increased eye protection. Also, the eye is much less sensitive to HEV (the violet and blue) light; so its reduction does not impact on the perception of adequate light intensity for normal vision. Melanin is a very useful pigment for the reduction of high energy visible light because it is able to reduce violet and blue without disturbing color perception. However, melanin occurs naturally in different colors (red, yellow, brown) and not all filter the HEV light in the same way.

U.S. Pat. No. 5,112,883 to James M. Gallas describes the broad use of melanin lenses in such light filters. More recently, in U.S. patent application Ser. No. 10/850,228 of Sugimura, Hideyo (published on Jan. 13, 2005), entitled "Photochromic Plate Containing Melanin," melanin has been proposed to be used in combination with photochromic dyes because such a combination would provide a lightly-tinted HEV-absorbing lens (melanin alone) that would darken in light because of the presence of the photochromic dye (hereinafter referred to as the '228 Application. However, the melanin described by the '228 Application uses a brown melanin. While this brown melanin does reduce HEV light more than the non-HEV light at 550 nm—where the eye is most sensitive—the difference in the transmission is insignificant. That is, the brown melanin in the Sugimura patent will tend to also reduce a significant amount of green light as well as HEV light—unless the melanin concentration is low. However, if the melanin concentration is too low, then the use of melanin to reduce glare and offer protection from sunlight damage will have very little efficacy. This difficulty arises because the filtration is being shared by both melanin and a second dye (the photochromic dye). For this reason, Sugimura was forced to limit the concentration of melanin, and therefore its range of transmission. It ranged from 40% to 80%. This transmission range would preclude a very important application of the concept of a high energy visible (HEV) lens in combination with a photochromic dye in night driving lenses, which by European standards, cannot be lower than 80%.

The use of yellow melanin in accordance of the present invention as a filtering pigment offers several advantages over the prior art. These advantages will become evident in the following description.

SUMMARY OF THE INVENTION

In order to make an effective HEV reducing melanin-photochromic dye system, it is necessary to use a special melanin that is yellow. Such a system would allow significant HEV reduction and yet very high luminous transmission values of greater than 80% because the transmission spectrum of the yellow melanin has very low values where the eye is least sensitive and high values where the eye's sensitivity is greatest. In this system, filtration is due only to the yellow melanin and at low light intensities—such as for computer use or in the case of night driving. Then under stronger light conditions, a photochromic dye would be activated and provide the darkening needed for outdoor sunlight use.

These points are best illustrated by the curves of FIG. 1. In FIG. 1, curve "series 2," illustrates the sensitivity of the human eye to visible light. It peaks at about 550 nm (green light). It also shows that the eye is very insensitive to light in the wavelength region between 400 and 450 nm (blue light). Of course, the graph also shows that the eye is equally insensitive to red light between 650 and 700 nm. Both series 1 and series 3 curves of FIG. 1 show the transmission of melanins. The curve of series 3 is a brown melanin that is presently produced by Photoprotective Technologies, Inc. of San Antonio, Tex. Series 1 curve shows the transmission of a yellow melanin disclosed herein and made in accordance with the present invention. The yellow melanin makes feasible the goal of reducing HEV light adequately—by having a low transmission in the violet and blue and still having a high transmission in the wavelength region where the eye is most sensitive. The brown melanin is not suitable because its transmission is too low in the region where the eye is most sensitive.

BRIEF DESCRIPTION OF THE DRAWINGS

For a detailed description of the present invention, reference will now be made to the accompanying drawings wherein.

DETAILED DESCRIPTION OF THE INVENTION

Figure 4:
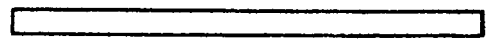
FIG. 4 is a diagram of a transparent solid substrate light filter, containing a yellow dyeing agent such as yellow melanin, a yellow form of the polymerization product of 3hydroxy-kynurenine, a yellow form of an asphaltene or a yellow form of a maltene and also a photochromic dye uniformly distributed throughout the thickness of the light filter.
Figure 5:
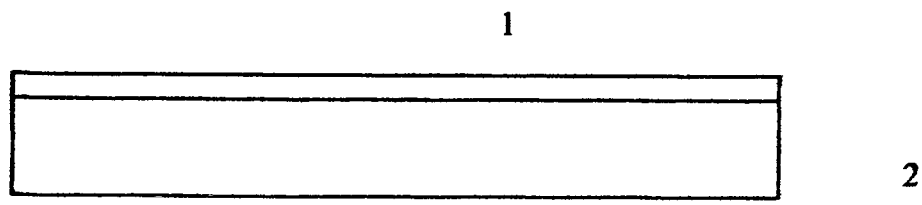
FIG. 5 is a diagram of a transparent solid light filter in which one or both of the dyes is contained in a thin region which is nominally 5 to 15 microns at the surface of the light filter 2.
Figure 6:
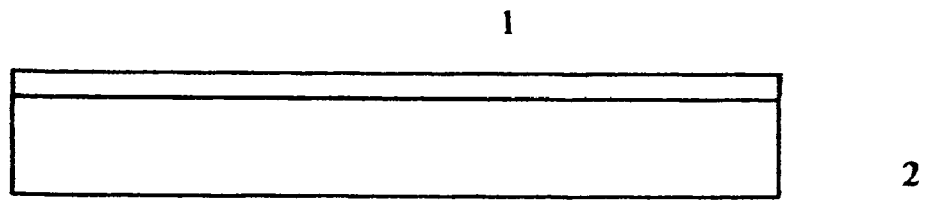
FIG. 6 is a diagram of a transparent light filter in which one or both of the dyes is contained in a thin hard coating which is nominally 5 to 15 microns at the surface of the light filter 2.
Figure 7:
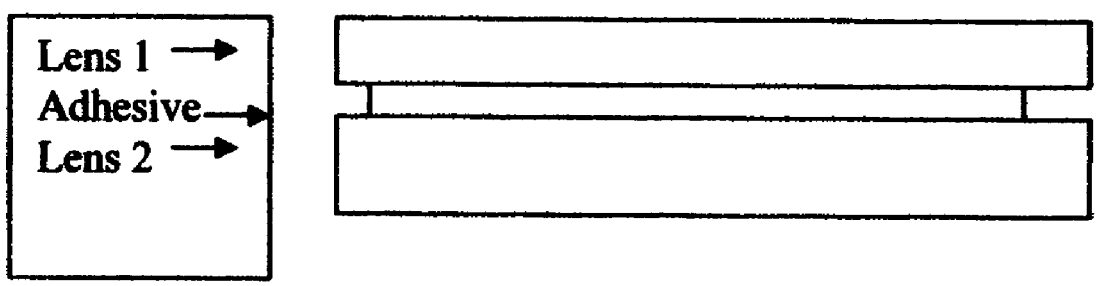
FIG. 7 is a diagram of a laminated lens system in which either the yellow melanin or the photochromic dye, or both, is dispersed in an adhesive between two lenses and the remaining dye is dispersed in one of the two lenses.

The term "solid transparent substrate", as used in this patent application, is a solid object made of a clear glass or a polymer, and generally taking the form of a light filter. Examples of such are, but not limited to, flat or curved sheets of plastic or glass such as sunglass lenses, ophthalmic lenses, windows, contact lenses, and computer screens. A diagram of a transparent solid substrate that may or may not contain a dye is shown in FIG. 4.

The term "thermoset" process, as used herein, is a process in which the plastic by the action of an oxidizer or initiator acting upon a monomeric liquid, causing the monomer to polymerize. The term "thermoplastic" process refers to the process in which the plastic is already formed and is caused to flow or become liquified by the action of heat and pressure.

The term "uniformly dispersed" means that the synthetic lens pigment shall be mixed sufficiently well within the solid transparent substrate that there is negligible light scatter or haze when objects are viewed through the solid transparent substrate that contains the dye.

Figure 1:
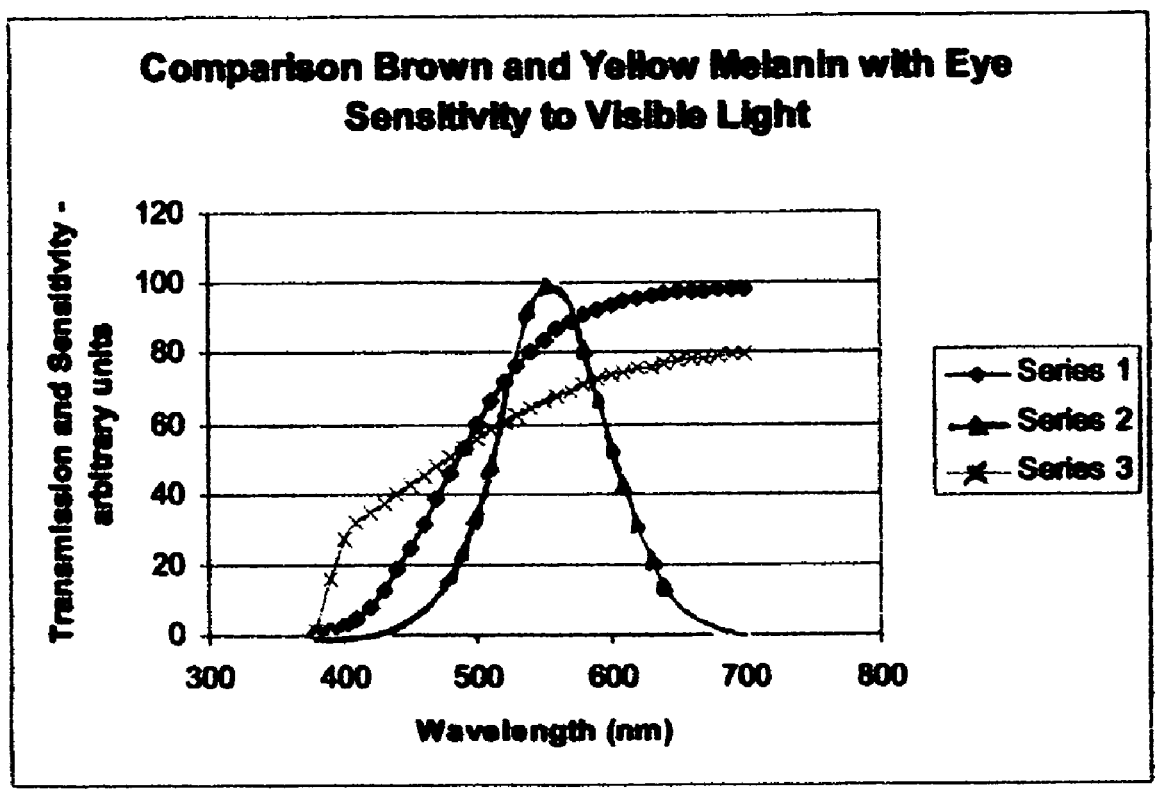
FIG. 1 depicts three graphs wherein series 1 curve illustrates the transmission spectrum of yellow melanin, series 2 curve illustrates the sensitivity of the human eye to visible light and series 3 curve illustrates the transmission spectrum of brown melanin.

One of the essential features of this invention is to make a lens apparatus that uses a melanin, or a melanin like dye, that is processed in such a way that its transmission spectrum follows, as closely as possible, the shape of the eye sensitivity curve series 2 of FIG. 1. Such a melanin or melanin-like dye will, in general, have a yellow color and can be processed in several ways to achieve such a transmission spectrum. The term "melanin like dye" refers to a dye that has a transmission spectrum similar to that of melanin. In accordance with the present invention, such dyes are a yellow form of the polymerization product of 3hydroxy-kynurenine, a yellow form of an asphaltene or a yellow form of a maltene In general, melanin consists of a distribution of molecular weights and particle sizes. There is also heterogeneity in its chemical structure reflected in properties such as molecular polarity. Because of this, standard techniques can be used to separate and isolate different portions of a melanin sample according to both size and polarity. Generally the smaller sized units will have less absorption in the red end of the optical spectrum and will therefore appear more yellow.

In addition to the techniques mentioned above, melanins can be prepared that already tend to be yellow. This can be obtained by disrupting the conjugation of the synthesizing melanins by including certain other molecules besides the standard melanin precursors. Another method for making a yellow melanin is to bleach or oxidize the melanin sample after it is already polymerized. Such oxidation could affect both the conjugation and the particle sizes. Finally, any combination of the above mentioned techniques can be used to produce a yellow melanin.

Hydrophilic yellow melanin can be formed by first synthesizing melanin in the standard way, in aqueous media, by using a standard melanin precursor, like dopamine, an oxidizer, like poatsium persulphate, and by raising the pH—and then followed by bleaching with hydrogen peroxide. Further fractionation to select smaller molecular weight portions of the melanin can be achieved by adding increasing amounts of a solvent miscible with water but which, because of it different polarity, selectively precipitates the larger molecular weight portions of the melanin. Thus different segment of the molecular weight or size distributions can be obtained by adding varying amounts of a co-solvent such as tetrahydrofuran.

Hydrophilic yellow melanin can also be formed as described above, but with the addition of L-cysteine during the synthesis and this is described in the melanin scientific literature. L-cysteine is added in comparable molarity along with a standard melanin precursor such as L-Dopa and a suitable oxidizer such as potassium persulphate and by raising the pH.

In the preferred embodiment, hydrophobic melanin is prepared according to the methods described in U.S. Pat. No. 5,112,883 and in a European patent by Gallas (WO9323480), by transferring aqueous melanin to an organic solvent such as acetonitrile or tetrahydrofuran and then derivatizing it with a suitable derivatizing agent such as methcryloyl chloride. Smaller molecular weight fragments can be obtained by adding a second organic solvent of lower polarity in varying amounts causing increasing amounts of derivatized melanin to precipitate. Thus, continuously different molecular mass sections of melanin can be isolated. In particular, the smallest molecular weights will remain in the double solvent system—and hence be isolated—when the highest concentrations of the second solvent are present.

Applicant has found further that a yellow melanin can be made—by bleaching or oxidizing the smaller molecular weight fractions of the derivatized melanin described above—with the transmission spectrum shown in FIG. 1, series 1 above.

Another particular feature that makes melanin so attractive for optical filters is its ability to reduce HEV light without disturbing the perception of color. Applicant has been able to use the Farnsworth Munsell 100 color test to confirm this advantage of melanin filtration. More significantly, melanin's ability to preserve color perception applies and extends to the case of yellow melanins—even though yellow dyes used in filters generally disturb the perception of color for those wearing such light filters.

This optical performance characteristic of melanin must relate to its optical absorption or optical transmission spectrum and although these spectra vary among red, brown and yellow melanins, one aspect remains constant. That aspect is that all of the absorption spectra are monotonically—increasing functions of energy—throughout the entire visible spectrum of wavelengths and well into the UV region. Furthermore the primary differences occur on the red end of the optical spectrum (melanins with greater optical density in the region 600 nm to 700 nm appear more brown).

One of the essential features of this invention is to attain a lens apparatus that uses a yellow melanin, or a yellow melanin-like dye that has a transmission spectrum that follows, as closely as possible, the shape of the eye sensitivity curve of FIG. 1 and which also preserves the perception of color with luminous transmission in the dark greater than 80%, and in combination with a photochromic dye which, when activated in sunlight will have a total luminous transmission of between 10% and 20%.

Photochromic Dyes

Figure 2:
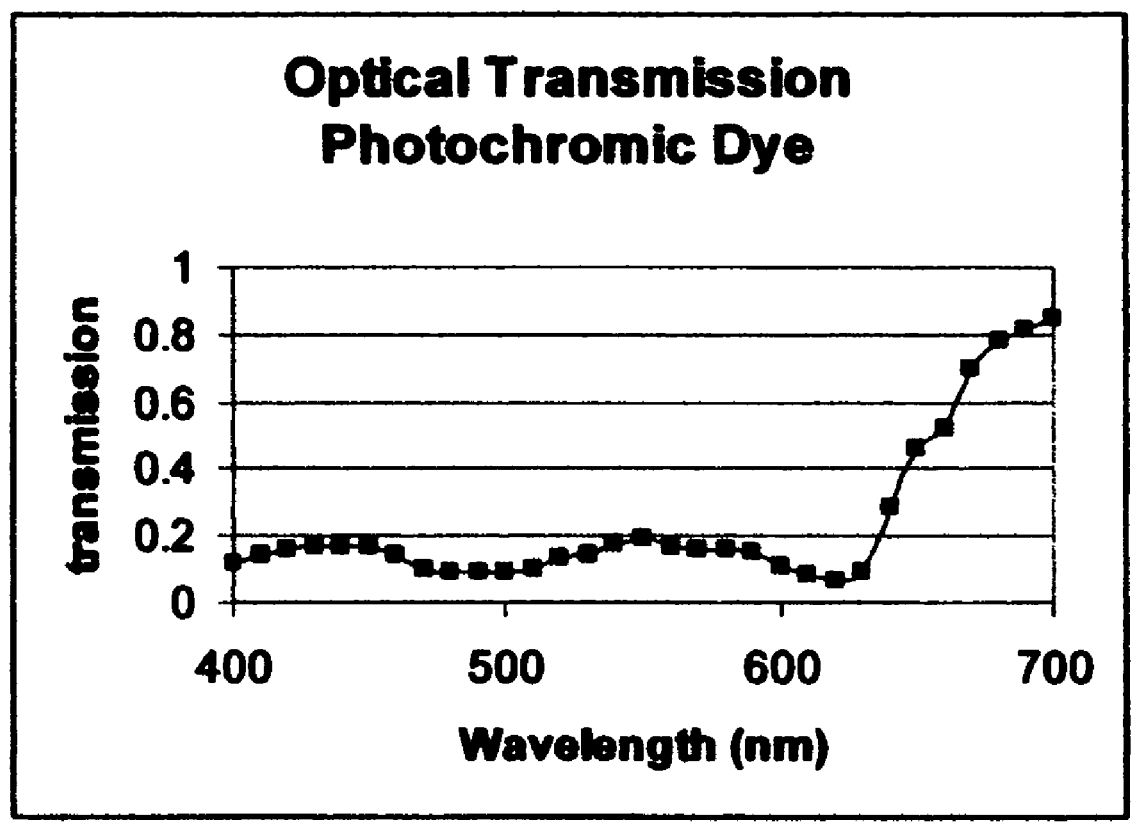
FIG. 2 is a graph that shows the transmission spectrum of a combination of two photochromic dyes, namely, indolino spironaphthoxyazines and pyridobenzoaxine.

There are many commercially available photochromic dyes that absorb light in the visible range of wavelengths and the particular choice of a photochromic dyes to be used in this invention is not a significant issue. A transmission spectrum of one such dye is shown in FIG. 2. The transmission spectrum is a combination of two photochromic dyes—indolino spironaphthoxyazines and pyridobenzoaxine. However, in the context of this invention, any photochromic dye—or combination of photochromic dyes—that transmit light throughout the visible region of wavelengths, and which are used at concentrations so as to yield a luminous transmission values of 10% to 20% when activated in sunlight are acceptable.

Preparation of Selectively Precipitated or Fractionated Melanin

Melanins are highly-irregular, nanometer-sized, sheet-like polyphenols which tend to aggregate under a variety of chemical and physical conditions including intermolecular stacking forces, solution pH, and the presence of metal ions in solution. Scientific research suggests that in any synthetic melanin product, there is a range of molecular weights. Different sections of this molecular weight distribution may also have different polarities. Both molecular weight and polarity can impact on the dispersability of a polymer in a solvent system or in a melt flow system as in a thermoplastic, injection molding process. In order to achieve good dispersion and low haze levels in lenses made with melanin, chemical derivatization is carried out on aqueous melanin as described in U.S. Pat. No. 5,112,883. In such chemical modifications, melanin is transferred from water to an organic solvent such as methylene chloride or tetrahydrofuran (THF) where it is treated with a derivatizing agent—such as methcryloyl chloride or methylchlorofromate. To obtain a powder form suitable for compounding with the thermoplastic lens material, the organic solvent containing the derivatized melanin is then injected into a solvent with an appropriate polarity such as petroleum ether or hexane in which the derivatized melanin is insoluble.

In a non-selective precipitation, the ratio of hexane volume to the THF volume is about 10 to 1 with the result that more than 90% of the melanin is precipitated. The precipitated melanin is then filtered and dried in a vacuum oven. The powder can then be used in a thermoplastic process just as any other dye powder.

While dispersion in liquid plastic resin—in a thermoset or in a thermoplastic process—is greatly improved by derivatization, haze levels in some thermoplastics like acrylic and polycarbonate are still in the range of 2% to 4%. Applicant has found that significant improvement in haze is achieved when derivatized melanins are further purified or isolated by selective precipitation.

In such selective precipitation, hexane is added to the THF-melanin solution gradually, and in relatively small volume increments—in stages. For example, in the first stage, hexane is added to the methylene chloride-melanin solution, in a volume ratio of 1 (hexane) to 3 (methylene chloride-melanin solution). In this initial stage, only a small portion or fraction of the melanin precipitates. This material is filtered out with filter paper and dried, while the majority of the melanin remains in solution. The filtered and dried portion is hereinafter referred to as Portion I. Then, in a second stage, an additional volume of hexane is added to the same melanin-methylene chloride solution so that a higher ratio of hexane to the melanin-methlylene chloride solution is achieved—for example a ratio of 1:2. In this case, some more melanin precipitates out of the solution and is also filtered, dried and collected. The filtered and dried portion is hereinafter referred to as Portion II. In a third stage, additional hexane is added to achieve a ratio of 1:1 and an additional amount of melanin is precipitated and filtered and dried. This filtered and dried portion is hereinafter referred to as Portion III. Finally, an additional amount of hexane is added to the material remaining in solution to achieve a ratio of 3:1. The precipitated material is collected in filter paper and dried and this filtered and dried portion is hereinafter referred to as Portion IV.

Applicant has found that melanin powder Portions II, III and IV will dissolve in diethylene glycol bis-allylcarbonate (trade name CR39) very well and at concentrations appropriate for sunglass darkness (about 15% luminous transmission) at a path length of 1.5 mm. However, CR39 is the liquid monomer resin of a thermoset polymer. Applicant has further found that Portion II will cause haze in a thermoplastic application; applicant has further found that Portion IV will not cause haze in either acrylic or polycarbonate and that Portion III will cause haze in polycarbonate but no haze in acrylic.

In summary, applicant has found that melanin that remains in solution at higher ratios of petroleum ether or hexane or, in general, solvents with very low polarity will have less haze than melanin that precipitates with low ratios or amounts of low polarity solvent.

Preparation of Yellow Melanin

Applicant has further found that it is possible to produce a yellow melanin powder by oxidation of the derivatized melanin from Portion IV.

PREFERRED EMBODIMENTS

In the first preferred embodiment, yellow melanin is dissolved into a liquid thermoset monomer such as CR39 and an ophthalmic lens is made from a casting of this material in an appropriate mold. A photochromic dye is then adsorbed or imbibed or tinted onto the surface of the lens—generally using heat and relying on diffusion of the photochromic dye into the surface of the plastic lens.

In a second preferred embodiment, yellow melanin is compounded with a thermoplastic such as polycarbonate and an ophthalmic lens is made in an injection molding process using an appropriate mold. A tintable hard coat is applied to the surface of the lens and a photochromic dye is then adsorbed or imbibed or tinted onto the surface hard coating on the surface of the lens—generally using heat and relying on diffusion of the photochromic dye into the surface of the hard coating.

While melanin can be compounded and injection molded into a thermoplastic optical lens of approximately 1.5 mm, or incorporated into a thermoset plastic lens as described in the preferred embodiments, other lenses that are more wafer-like and having a thickness of less than 1 mm are possible options as well. The photochromic dye is then imbibed into the surface of the yellow melanin-containing thermoplastic lens.

The combination of a melanin dye and a photochromic dye in an ophthalmic lens system can occur in a variety of other ways—all of which are obvious configurations to those skilled in the art. These include co-dissolving yellow melanin and photochromic dyes with an optical thermoplastic in a suitable solvent system and then allow the solvent to evaporate resulting in a film that contains the dyes. Alternatively, both dyes can be imbibed into the surface of a lens in a tinting process. Alternatively, both dyes can be co-dissolved in a thermoset optical plastic resin that is poured into a mold and allowed to cure to form an optical lens. If it is necessary to avoid any melanin-photochromic dye interactions, then the two dyes can be introduced separately into these plastics. For example, the yellow melanin powder can be co-dissolved with an optical thermoplastic in a suitable solvent system and then allow the solvent to evaporate resulting in a film that contains only the yellow melanin; then the formed film can be adhered or bonded to a solid plastic lens that contains the photochromic dye formed previously in one of the standard ways such as a compounding process.

Figure 3:
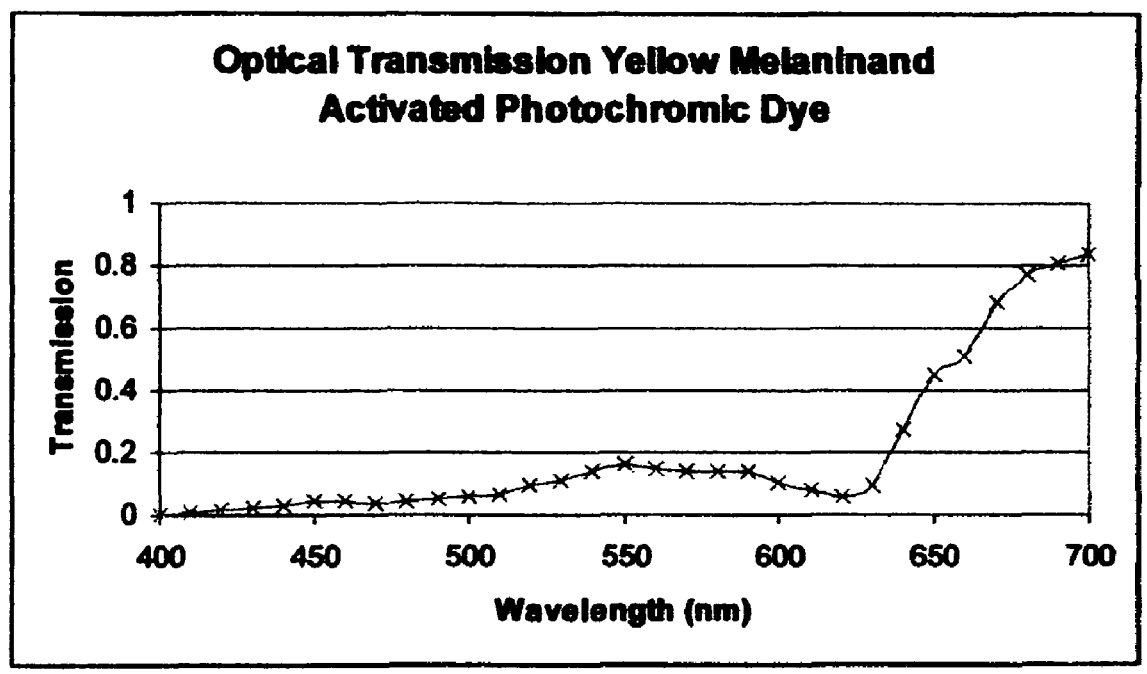
FIG. 3 is a graph that shows the total transmission of the yellow melanin and the photochromic dye of FIG. 2 in the sunlight-activated state.

When such combination of lenses is carried out the final sunlight-activated transmission will have the transmission of the melanin—multiplied at each wavelength—by the transmission of the photochromic dye as, for example, the transmission of the yellow melanin of FIG. 1 and the photochromic dye of FIG. 2 shown in FIG. 3.

Similar procedures as described herein for the preparation, processing and use of yellow melanin having low haze may be used in accordance with the present invention to prepare, process and use a yellow form of the polymerization product of 3hydroxy-kynurenine, a yellow form of an asphaltene or a yellow form of a maltene. Like the yellow melanin, the yellow form of the polymerization product of 3hydroxy-kynurenine, the yellow form of an asphaltene or the yellow form of a maltene may be used as a yellow filter agent to form a light filter having a low haze.

The following examples further illustrate the invention but are not to be construed as limitations on the scope of the invention contemplated herein.

EXAMPLE 1

Preparation of Selectively Fractionated, Portion IV Melanin

Ten (10) grams of derivatized melanin obtained from Photoprotective Technologies, Inc. of San Antonio, Tex., was dispersed in 100 mL of tetrahydrofuran (THF) by stirring for 1 hour. 100 mL of hexane was added next drop-wise over a period of 1 hour. The precipitated material was separated and an additional 200 mL of hexane was added drop-wise to the material that remained suspended to obtain a hexane to THF ratio of 3:1. The precipitated material (Portion IV) was collected and dried.

EXAMPLE 2

Preparation of Yellow Melanin from Fractionated Melanin 1. 340 mg of selectively precipitated Portion IV melanin and 1.50 g of benzoyl peroxide were dissolved in 20 mL of THF in a 50 mL round bottom flask
2. The reaction vessel was fitted with an air cooled condenser.
3. The reaction was placed in a water bath which was heated from 60-640 C. for 20 h.
4. The reaction was removed from the heat, cooled and poured into 80 mL of hexane over 20 sec with swirling.
5. The precipitate was allowed to settle and the supernatant poured off.
6. 20 mL of THF was added and the material quickly dissolved. This was poured into 70 mL of hexane over 20-30 sec with swirling. Fluffy precipitate appeared quickly and after 20 min the supernatant was filtered.
7. The material was allowed to dry and yielded about 240 mg of yellow melanin.
8. The spectra of the yellow melanin is shown in series 1 curve of FIG. 1.

EXAMPLE 3

Preparation of a Yellow Melanin Photochromic Lens System

One hundred (100) mg (0.1 g) of yellow melanin, as prepared in Example 2. was dissolved in 100 g of CR39 (diethey-lene glycol bis-allylcarbonate), trade name of PPG. The system was heated to 55 degrees Celsius and three grams of benzoyl peroxide was dissolved and the mixture was poured into a glass lens mold with a spacing of 1.5 mm. The temperature of the mold was increased gradually over three hours and the solid plastic lens was removed. It had a transmission of 85% at 550 nm.

A mixture of two photochromic dyes, indolino spironaph-thoxyazines and pyridobenzoaxine was uniformly dispersed in a Loctite adhesive and several drops were placed onto the lens of Example 1 containing the yellow melanin. A second clear lens with the same radius of curvature as the first lens was pressed against the first lens to form a laminated lens. The concentration of the photochromic dyes was adjusted to give the optical spectrum shown in FIG. 3 for the laminated lens under light-activated conditions.

EXAMPLE 4

Yellow Melanin and Photochromic Dye

Yellow melanin powder was dissolved into liquid CR39 monomer resin at a concentration so as to yield an optical transmission of about 85% at 550 nm for a lens of thickness 1.5 mm. The transmission spectrum of this lens is represented by the curve of series 1 in FIG. 1. Subsequently, a combination of two photochromic dyes—indolino spironaph-thoxyazines and pyridobenzoaxine was used to imbibe the yellow melanin—CR39 lens to give a sunlight-activated optical transmission of about 20% at 550 nm. The resulting transmission is shown in FIG. 3.

While the invention has been described herein with reference to certain specific materials, procedures and examples, it is understood that the invention is not restricted to the particular materials, combinations of materials and procedures selected for the purpose of illustrations. Numerous variations of such details can be employed by those skilled in the art within the scope of this invention which is defined by the appended claims.

What is claimed is:

1. A light filter consisting essentially of:
   A yellow filter agent that filters light, the yellow filter agent being a yellow melanin, wherein the yellow filter agent is a yellow form of the polymerization product of 3 hydroxy-kynurenine, or an asphaltene; and
   A photochromic dye.
2. The light filter according to claim 1, further including a glass material.
3. The light filter according to claim 1, further including a plastic material.
4. The light filter according to claim 3, wherein the plastic material is a diethylene glycol bis-allyl carbonate material.
5. The light filter according to claim 3, wherein the plastic material is a polycarbonate material.
6. The light filter according to claim 3, wherein the plastic material is a nylon material.
7. The light filter according to claim 3, wherein the plastic material is a polyurethane material.
8. The light filter according to claim 3, wherein the photochromic dye and the yellow filter agent are both incorporated into the body of the plastic material.
9. The light filter according to claim 3, wherein the photochromic dye and the yellow filter agent are both incorporated uniformly into the body of the plastic material.
10. The Light filter according to claim 3, wherein the photochromic dye is on the surface of the plastic material and the yellow filter agent is incorporated into the body of the plastic material.
11. The light filter according to claim 3, wherein the yellow filter agent is on the surface of the plastic material and the photochromic dye is incorporated into the body of the plastic material.
12. The light filter according to claim 3, wherein the photochromic dye and the yellow filter agent are on the surface of the plastic material.

* * * * *

UNITED STATES PATENT AND TRADEMARK OFFICE
CERTIFICATE OF CORRECTION

| | |
|---|---|
| PATENT NO. | : 8,048,343 B2 |
| APPLICATION NO. | : 11/417419 |
| DATED | : November 1, 2011 |
| INVENTOR(S) | : James Gallas and Ira Hessel |

It is certified that error appears in the above-identified patent and that said Letters Patent is hereby corrected as shown below:

In the Claims, Column 8, line 32, cancel the text beginning with "1. A light filter consisting essentially of." to and ending "A photochromic dye." in column 8, line 37, and insert the following claim:

--1. A light filter consisting essentially of:
A yellow filter agent that filters light, wherein the
yellow filter agent is a yellow melanin, or a yellow
form of the polymerization product of
3-hydroxy-kynurenine, or an asphaltene; and
A photochromic dye.--

Signed and Sealed this
Nineteenth Day of June, 2012

David J. Kappos
*Director of the United States Patent and Trademark Office*